(12) United States Patent
Noles, Jr.

(10) Patent No.: US 10,519,044 B2
(45) Date of Patent: Dec. 31, 2019

(54) TREATMENT OF PRODUCED WATER FROM A SUBTERRANEAN FORMATION

(71) Applicant: Noles Intellectual Properties, LLC, Washington, OK (US)

(72) Inventor: Jerry W. Noles, Jr., Blanchard, OK (US)

(73) Assignee: Noles Intellectual Properties, LLC, Washington, OK (US)

( * ) Notice: Subject to any disclaimer, the term of this patent is extended or adjusted under 35 U.S.C. 154(b) by 2 days.

(21) Appl. No.: 15/394,627

(22) Filed: Dec. 29, 2016

(65) Prior Publication Data
US 2018/0186659 A1 Jul. 5, 2018

(51) Int. Cl.
| | |
|---|---|
| *C02F 1/04* | (2006.01) |
| *C02F 1/12* | (2006.01) |
| *B01D 1/18* | (2006.01) |
| *B01D 1/14* | (2006.01) |
| *B01F 3/04* | (2006.01) |
| *B01D 1/16* | (2006.01) |
| *B01D 3/34* | (2006.01) |
| *B01F 5/02* | (2006.01) |
| *C02F 1/10* | (2006.01) |

(52) U.S. Cl.
CPC ............... *C02F 1/043* (2013.01); *B01D 1/14* (2013.01); *B01D 1/16* (2013.01); *B01D 1/18* (2013.01); *B01D 3/346* (2013.01); *B01F 3/04248* (2013.01); *B01F 5/0206* (2013.01); *C02F 1/04* (2013.01); *C02F 1/048* (2013.01); *C02F 1/12* (2013.01); *B01F 2003/04319* (2013.01); *B01F 2003/04872* (2013.01); *C02F 1/10* (2013.01)

(58) Field of Classification Search
CPC .... B01D 1/14–1/20; C02F 1/048; C02F 1/10; C02F 1/12
See application file for complete search history.

(56) References Cited

U.S. PATENT DOCUMENTS

| | | | |
|---|---|---|---|
| 289,785 A | 12/1883 | Stuart | |
| 293,782 A | 2/1884 | Powers | |
| 2001/0040135 A1* | 11/2001 | Taira | C02F 1/725 210/763 |
| 2011/0036703 A1* | 2/2011 | Duesel, Jr. | B01D 1/0058 203/11 |

(Continued)

OTHER PUBLICATIONS

Final Office Action dated Jul. 29, 2019 for corresponding U.S. Appl. No. 15/394,612.

(Continued)

*Primary Examiner* — Renee Robinson
(74) *Attorney, Agent, or Firm* — Ramey & Schwaller, LLP

(57) ABSTRACT

Systems for water treatment may include an evaporation unit, wherein the evaporation unit may comprise: a first blower; a spacer, wherein the spacer may be fluidly coupled to the first blower; wherein the evaporation unit may be configured to aerate and evaporate water; and a drying tunnel, wherein the drying tunnel may comprise: a second blower, wherein the second blower may be fluidly coupled to an end of the drying tunnel; a heater coupled to an exterior surface of the drying tunnel; nozzles disposed between the heater and the second blower; and a chamber configured to collect solids; wherein the drying tunnel may be configured to evaporate water.

19 Claims, 13 Drawing Sheets

(56) References Cited

U.S. PATENT DOCUMENTS

2011/0140457 A1* 6/2011 Lakatos .................. B01D 1/14
                                                              290/1 R
2018/0186658 A1    7/2018 Noles
2018/0186659 A1    7/2018 Noles

OTHER PUBLICATIONS

Non-Final Office Action dated Oct. 4, 2018 for corresponding U.S. Appl. No. 15/394,612.

* cited by examiner

TREATMENT OF PRODUCED WATER FROM A SUBTERRANEAN FORMATION

BACKGROUND

Within recent years, the oil and gas industry has developed the use of hydraulic fracturing to produce what was once considered nonproductive oil and gas formations. This hydraulic fracturing technology may require the use of high volumes of water to be pumped into subterranean wells under tremendous rates and pressures to pry rock apart, thereby allowing the oil and gas that is trapped within the matrix of the oil and gas formations to migrate to the wellbore and production casing. Although the use of this technology may have allowed high volumes of oil and gas recovery from the oil and gas formations, the use of these large volumes of water has been widely scrutinized. Because the water that may be used during these fracturing operations is preferably clean and free from contaminants, current technologies may use fresh water sources that may normally be used for irrigation and human consumption. The use of these fresh water supplies may have an impact on the availability of fresh water for human consumption and irrigation.

Although the water that may be pumped into the oil and gas formations may be recovered over the production life of the oil and gas well, the water may become contaminated with chemicals from the fracturing process and minerals that are leached from the producing reservoir during the production of the well. Many oil and gas reservoirs may have been created from decomposed organic matter generated from oceanic sea beds. Fresh water may mix with the salt water that may typically be produced from the hydrocarbon formations making both the frac water and the formation water unsuitable for human consumption or reuse for hydraulic fracturing. This water that may be produced or that flows back from the well may then be disposed of by pumping it into deep nonproductive oil and gas formations. This cycle may be repeated for each well and may use hundreds of thousands of barrels for each operation.

Recently, this disposal process has come under scrutiny due to increased seismic activity that has occurred in conjunction with the pumping of the water into these subterranean reservoirs. It is for this reason that the industry has an increased need to find a way to reduce the amount of water that may be disposed of in these underground formations. The volume of water and the high level of the Total Dissolved Solids ("TDS") may make it difficult to filter using a Reverse Osmosis unit for surface discharge purposes. In the past, distillation systems may have been used to evaporate and condense the water for discharge purposes. However, the cost for the energy or BTUs to distill the water proved to often be uneconomical to use on a large scale basis.

In another instance, evaporation processes may have been used to eliminate the water and recover the solids contained in the water. These systems may spray large volumes of water into the air using blowers and misting systems to evaporate the water. The solids may then fall into collection or evaporation pits. This process may be problematic due to wind causing the solids or salt to be blown outside of the evaporation pits or collection areas. This may then be compensated by the use of wind walls to prevent the drifting of the sprayed/misted water. These wind walls may generate static areas of high humidity air masses, thereby reducing the efficiencies of the evaporation process. In the past, this may have been compensated for by setting up wind sensors that would turn blowers on and off on different sides of the evaporation pits to compensate for wind direction.

In another instance, an enclosure may be placed over the entire evaporation pit to prevent drift caused by the wind. In this case, the enclosure may be ventilated to continuously move air into and out of the enclosure to avoid saturation of the air mass.

Therefore, there may exist a need for a system to evaporate and/or reduce the volumes of water that are being disposed of without the issues of containment that are generated by blowing high solids water into the atmosphere, and allowing them to fall into collection or evaporation pits.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
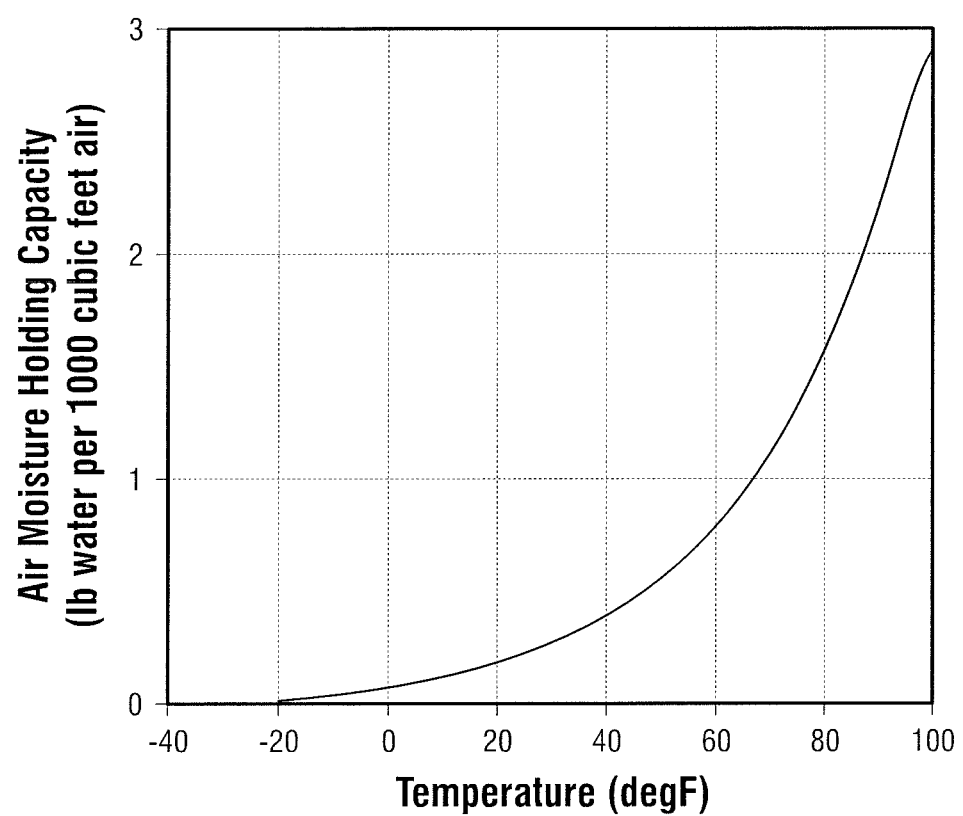
FIG. 1 illustrates a chart showing volumetric air requirements for evaporation based on the temperature of the air mass.

Water may exist naturally in subterranean formations and may be produced in conjunction with hydrocarbons from the subterranean formations. Water may also be injected into a subterranean formation to stimulate hydrocarbon production (e.g., hydraulic fracturing or fracking). When the water is produced from the subterranean formations, it may comprise amounts of dissolved salts and other substances which may make it unsuitable for agriculture and human consumption.

The present disclosure may generally relate to the treatment of contaminated water (e.g. salt water/brine), and more specifically to the evaporation of water produced from a subterranean formation. Embodiments of the present disclosure may include mechanical agitation with submerged aeration to saturate an air mass, thereby accelerating the evaporation process, without generating the environmental concerns of high total TDS fluids being carried outside of the evaporation zone. Brine may comprise a brine solution comprising at least 10 wt % NaCl. In some embodiments, brine may comprise a brine solution comprising about 10 wt % NaCl to about 25 wt % NaCl. In other embodiments, brine may comprise a brine solution comprising more than 25 wt % NaCl. Other ranges may include ranges above what may be considered dischargeable to surface ground waters. As the water becomes concentrated and saturated with salts, the heavier water may be pulled off and then injected into subterranean disposal wells at significantly lower volumes then normal, thereby reducing the subsurface pressurization and aiding in prevention of seismic occurrences.

By allowing air to be mixed and released below the water surface, the air mass may become saturated before it breaks the surface of the water. Systems, methods and devices of the present disclosure may substantially improve the evaporation efficiency of the water by allowing the air mass temperature to rise to the temperature of the water contained in a pit that the air mass is in contact with, which may be above the temperature of the air mass above the pit. This may be important during winter months where the air mass temperatures within certain regions may be below 30° F. Systems, methods and devices of the present disclosure may also allow for high rates of oxygen transfer due to the high volumes of air (e.g., 100,000 cubic feet of air per minute) that may be moved. By increasing the air that may be in contact with the water, the amount of dissolved oxygen may be increased. Standard aeration systems may use as much as 1,500 horsepower to move 5,000 cubic feet of air per minute. Of this 5,000 cfm, only a small percentage of the air mass may go into solution in the form of dissolved oxygen. This may typically be around 2% of the oxygen that is within the air mass, which may render the system 98% inefficient. To overcome these inefficiencies, higher volumes of air may need to be moved at lower horsepower ("HP"). In comparison, a 50 HP axial fan may move 100,000 cubic feet per minute ("cfm"), thereby increasing the amount of dissolved oxygen per horsepower by more than 30 times. In the past, aeration systems have relied on moving air (e.g., an air mass) into water in order to infuse oxygen into the water or setting up blowers that would feed headers, and the headers would then feed control lines that went into the water at various depths to feed diffusers or other mechanisms to distribute the air into the water. Systems, methods and devices of the present disclosure may eliminate the need for headers or control lines to distribute the air into the water.

In certain embodiments, flow back and/or produced water may be pumped or hauled into a storage pit or storage reservoir via trucks or other gathering systems. Blowers may be placed into the pit and spaced based on volumetric requirements for evaporation or for aeration purposes.

FIG. 1 illustrates a chart showing volumetric air requirements for evaporation based on the temperature of the air mass. It should be noted that the number of pounds of water that may be evaporated per 1,000 cubic feet of air may be highly dependent on the initial relative humidity of the air mass and the temperature of the air. This relative humidity may fluctuate during the course of the day. Therefore, systems, methods and devices of the present disclosure may include programs configured to turn on systems and devices of the present disclosure during low relative humidity times of about 30% to about 70%, thereby lowering the cost of energy and improving the efficiencies of a vapor transfer. For example, if the number of pounds of water per 1,000 cubic feet of air is 1, and the relative humidity is 70%, then the pounds of water that the 1,000 cubic feet may be capable of absorbing before becoming saturated or reaching 100% relative humidity may be 0.30 or 30% of the 1 pound per thousand cubic feet. Therefore, a blower that may move 10,000 cubic feet per minute may be capable of evaporating about 3 pounds of water per minute at an initial air mass relative humidity of 70%. However, at an initial relative humidity of 30%, about 7 pounds of water per minute may be evaporated. Based on this calculation, the average annual relative humidity may be used to calculate the number of evaporation devices and the size of the evaporation devices to achieve a certain volume of evaporation per day. The moisture holding capacity of air may be 1 lb of water per 1,000 cubic feet of dry air. The moisture holding capacity of air at 100° F. may be about 10 times the moisture holding capacity of air at 30° F. This may be an important observation, especially when working in areas where air temperatures may be low during certain times of the year.

Figure 2:
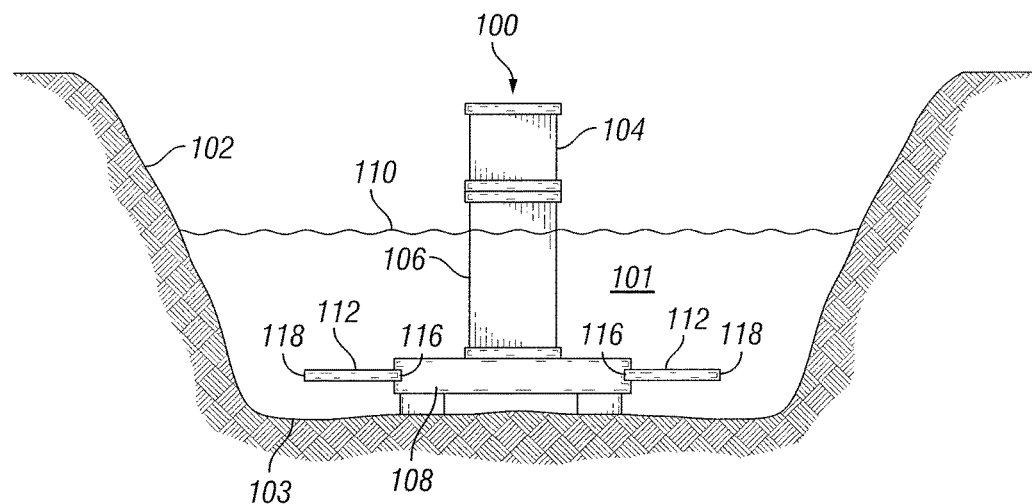
FIG. 2 illustrates an evaporation unit in accordance with embodiments of the present disclosure.

FIG. 2 illustrates an evaporation unit 100. Evaporation unit 100 may include blower 104, spacer 106, and diffuser 108. Evaporation unit 100 may be positioned within a body of water 101 of storage pit 102 for water (e.g., produced water which may include brine). The spacer 106 and diffuser 108 may be submerged (completely or partially) in the body of water 101. Blower 104 may be above the water surface 110. The body of water 101 may be received and stored in storage pit 102 from a subterranean formation. In embodiments, evaporation unit 100 may be electrically powered and may be placed at a depth below the water surface 110. This may range from about 4 inches below the water surface 110 to about 30 feet, relative to water surface 110. Evaporation unit 100 may also be powered by any other suitable source. Evaporation unit 100 may have a weight from about 200 lbs to about 1,000 lbs. Evaporation unit 100 may be suitable for gas-liquid reactions at temperatures below about 160° F. and pressures below about 30 psi. Evaporation unit 100 may biologically degrade organic substances and may further oxidize organic substances. Evaporation unit 100 may also provide aeration with any suitable gas, such as, for example, air, pure oxygen, ozone, $CO_2$, and the like. Placement/removal of evaporation unit 100 into/from storage pit 102 may be accomplished with a crane or any other suitable device. For example, a crane may lift/remove evaporation unit 100 from storage pit 102 (e.g., for maintenance, completion of evaporation process) and may place evaporation unit 100 into storage pit 102.

Blower 104 may include a high volume blower that may be placed above the water surface 110. Blower 104 may move over 100,000 cubic feet of air per minute. In certain embodiments, blower 104 may move about 10,000 cubic feet of air per minute to about 500,000 cubic feet of air per minute. Or multiple blowers 104 may be incorporated to move higher volumes. Blower 104 may be fluidly coupled to spacer 106. The inner diameter of blower 104 may be about 12 inches to about 96 inches. Blower 104 may be electrically powered and may include a motor rated from about 7 horsepower to about 150 horsepower. Blower 104 may also be powered by any other suitable means. Blower 104 may include ducted fans. Historically, ducted fans have not been used for aeration applications due to their inability to overcome high head pressure without cavitation. In order to compensate for the low pressure high volume capability of the ducted fans and function at greater depths, a small amount or about 5% to about 10% of the overall volume of the fan may be released along the spacer 106 and at sufficiently shallow depths, between about 4 inches to about 12 inches, into the body of water 101 as to allow the hydrostatic head pressure of the water to be gas cut thereby reducing the head pressure and allowing the air to then migrate to the next depth. Once the hydrostatic head pressure has been sufficiently gas cut to allow blower 104 to push air to the lowest point of the evaporation unit 100, the weight of water 101 in proximity of the outside of the evaporation unit 100 may be reduced by the volumetric displacement value of the air occupying that space. An example of this may be if the weight of the water 101 is 9.6 pounds per gallon in the storage pit 102, and the head pressure at a depth of 14 feet is 6.8 psi. By adding 50% by volume of air, the head pressure may be reduced to 3.4 psi or below the pressure values of the blower 104 capabilities.

Spacer 106 may include a hollow cylindrical pipe that may have an inner diameter that may reduce any friction from a moving air mass within spacer 106. Spacer 106 may extend from several feet above the water surface 110 to below the water surface 110. Spacer 106 may be made of any suitable material, such as, for example, metal (e.g., steel, alloys). The inner diameter of spacer 106 may be about 12 inches to about 96 inches. Spacer 106 may be designed to direct an air mass throughout the storage pit 102 to increase the amount of water (e.g., body of water 101) that the air mass is in contact with, thereby improving the evaporation or saturation of the air mass. Spacer 106 may be fluidly coupled to diffuser 108. Diffuser 108 may be positioned at a depth that may be below the water surface 110 and above a maximum head pressure that the blower 104 may be capable of generating. Diffuser 108 may be placed on the bottom 103 of storage pit 102. The coupling of the blower 104 to spacer 106 and the coupling of spacer 106 to diffuser 108 may be accomplished by any suitable means, such as, for example, threads, welds, bolts or combinations thereof. This coupling may eliminate the need for manifolds or headers to transfer the air from remotely positioned blowers. This coupling may further reduce the need for after coolers to be used to cool the air mass, thereby preventing damage to the diffuser 108. This coupling may also reduce friction, thereby reducing overall horsepower requirements.

Figure 3:
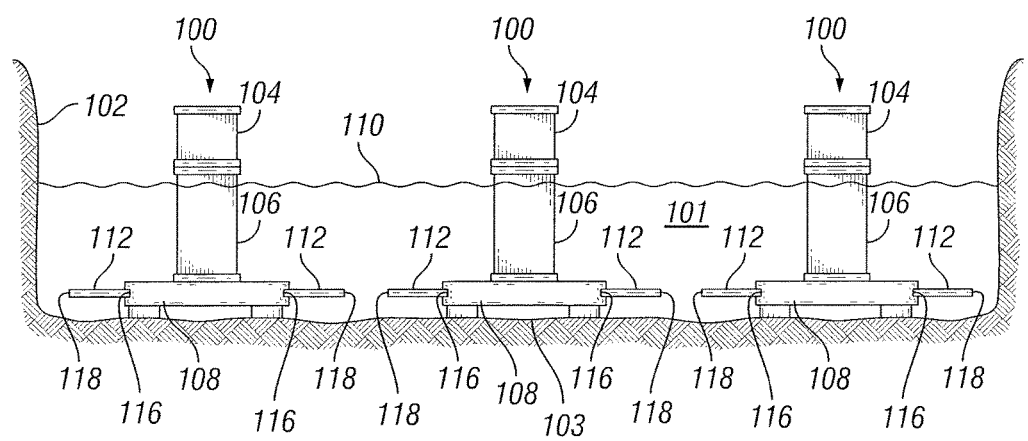
FIG. 3 illustrates a plurality of evaporation units in accordance with embodiments of the present disclosure.

During operation of evaporation unit 100, blower 104 may capture (e.g., via suction) an air mass from the surrounding area and may blow/force the air mass through spacer 106 into diffuser 108. The air mass may then exit diffuser 108 into the body of water 101, thereby aerating the body of water 101. The diffuser 108 may break the air mass into smaller bubbles (e.g., microbubbles) to increase the evaporation uptake of the air mass. Microbubbles may be bubbles with a diameter greater than 1 micrometer and less than 1 millimeter. Diffuser 108 may also provide turbulence and movement of the water (e.g., body of water 101), thereby increasing surface evaporation and fluid mixing. This may be important when the evaporation unit 100 is used for aeration of waste water treatment to aid in aerobic bacterial digestion or water clarification. As the water evaporates, substances in the water (e.g., salt) may fall into storage pit 102. The fallen substances (e.g., salt) may be removed from storage pit 102 to a storage container and/or vehicle. The unitized structure (e.g., the coupling of blower 104 to spacer 106 and the coupling of spacer 106 to diffuser 108) of evaporation unit 100 may substantially reduce the cost and infrastructure in treating contaminated water. Evaporation unit 100 may be deployed within minutes or hours, thereby allowing them to be moved from site to site based on demand. It should be noted that although a single evaporation unit 100 is depicted in FIG. 2, a plurality of evaporation units 100 may be utilized, as shown in FIG. 3.

Figure 4:
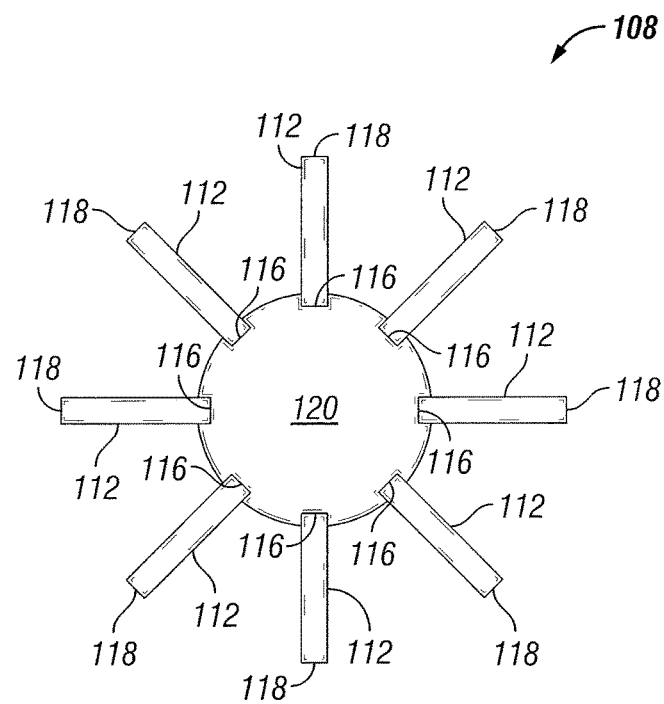
FIG. 4 illustrates a top view of a diffuser in accordance with embodiments of the present disclosure.

FIG. 4 illustrates a top view of diffuser 108. Diffuser 108 may comprise a plurality of arms 112 and a circular portion 120. The configuration of diffuser 108 may resemble a hub and spokes configuration. Each arm 112 may comprise a proximal end 116 and a distal end 118. Proximal end 116 may be coupled to circular portion 120 by any suitable means such as welds. Each arm 112 may be hollow and tubular in shape. In some embodiments, the plurality of arms 112 may rotate, allowing water within the arms 112 to be centrifugally evacuated, thereby generating a cavitation effect and aiding to overcome head pressure of the water and allowing the air to exit deeper below the water surface 110. Arms 112 may be of a rectangular tubing and may be of a length between about 12 inches to about 96 inches. Arms 112 may be configured to allow the rotation to create a negative pressure behind a leading edge of the arm 112 as to allow air to be drafted out into the body of water 101 from the blower 104. Each arm 112 may have a configuration as described below in FIGS. 5-8.

Figure 5:
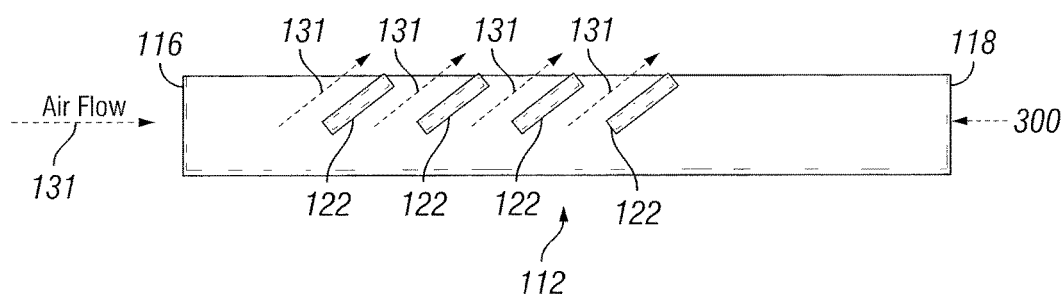
FIG. 5 illustrates an arm with a plurality of apertures in accordance with embodiments of the present disclosure.

FIG. 5 illustrates an arm 112 with a plurality of apertures 122 (e.g., slots). Each aperture 122 may have a diameter from about 1 inch to about 2 inches, and may be configured to funnel an air mass as the air mass exits each aperture 122, thereby creating microbubbles in a body of water (e.g., body of water 101 shown on FIG. 2). During operation of evaporation unit 100, blower 104 may capture (e.g., via suction) an air mass from the surrounding area and may blow/force the air mass through spacer 106 into diffuser 108. The flow of the air mass is denoted by arrows 131. The air mass may then exit diffuser 108 via apertures 122 into the body of water 101, thereby aerating the body of water 101. Apertures 122 may provide an air flow at an angle relative to the central axis (denoted by reference number 300). The angle may be any suitable angle to create the microbubbles. In embodiments, the angle may be about 10° to about 90°, alternatively about 10° to about 75°, alternatively about 40° to about 50° (e.g., 45°).

Figure 6:
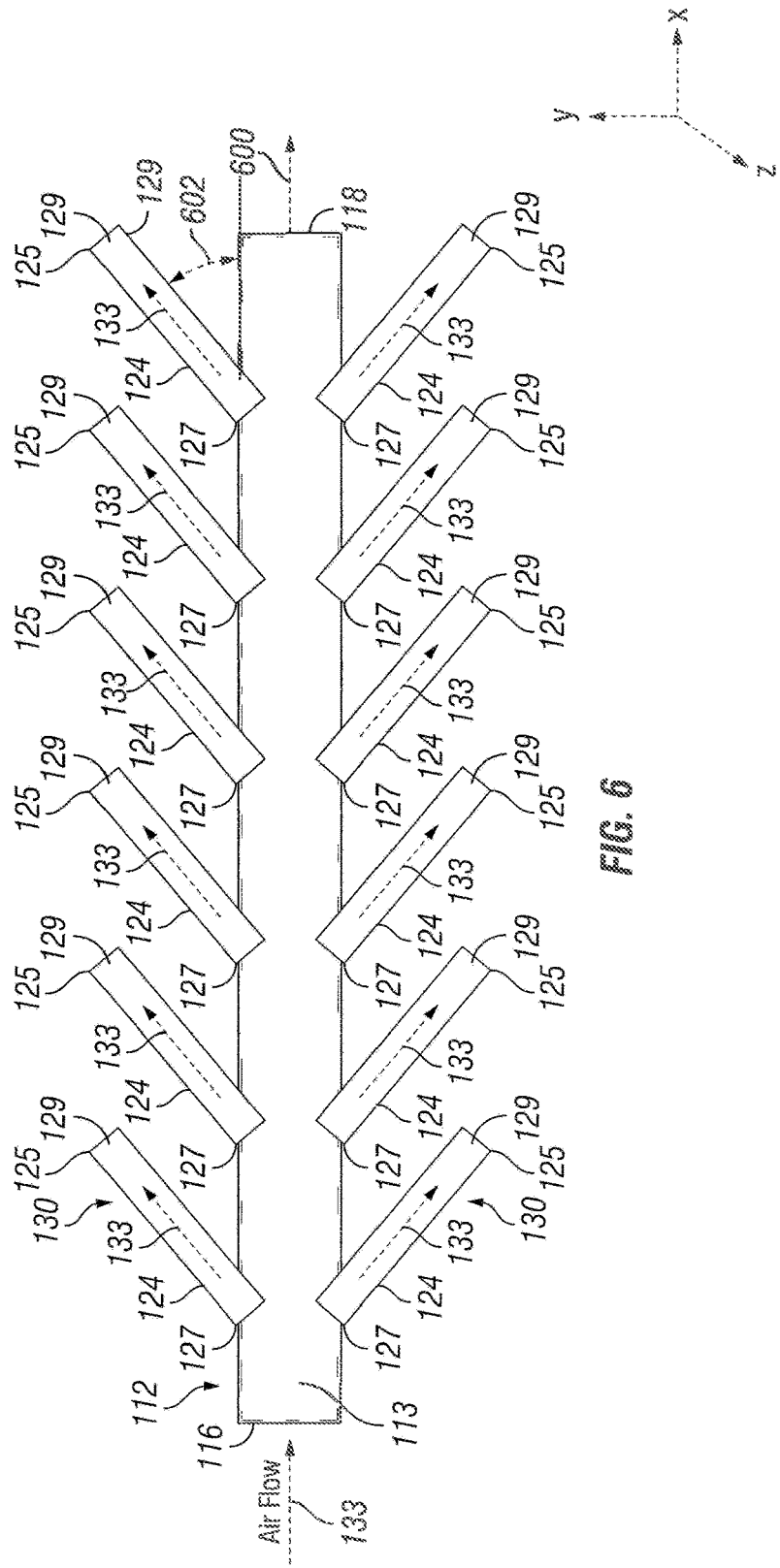
FIG. 6 illustrates an arm comprising a plurality of hollow tubes in accordance with embodiments of the present disclosure.

FIG. 6 illustrates an arm 112 comprising a plurality of hollow tubes 124. As shown, tubes 124 extend outward from arm 112. The plurality of hollow tubes 124 may each comprise a proximal end 127, which may be fluidly coupled to the body 113 of arm 112 by any suitable means such as welds. Each hollow tube 124 may be coupled to body 113 at angle 602 relative to the central axis 600 of arm 112. Angle 602 may be any suitable angle to create the microbubbles. In embodiments, angle 602 may be about 10° to about 90°, alternatively about 10° to about 75°, and alternatively about 40° to about 50° (e.g., 45°). Each tube 124 may have a length of about 8 inches to about 12 inches with an inner diameter of about 1 inch to about 4 inches. Each tube 124 may have an opening 125 positioned at a distal end 129 of each tube 124. Each tube 124 may be configured to create microbubbles in a body of water (e.g., body of water 101 shown on FIG. 2) as an air mass exits each tube 124 via opening 125. During operation of evaporation system 100, blower 104 (e.g., as shown on FIG. 2) may capture (e.g., via suction) an air mass from the surrounding area and may blow/force the air mass through spacer 106 into diffuser 108. The flow of the air mass is denoted by arrows 133. The air mass may then exit diffuser 108 via hollow tubes 124 into the body of water 101, thereby aerating the body of water 101.

Figure 7:
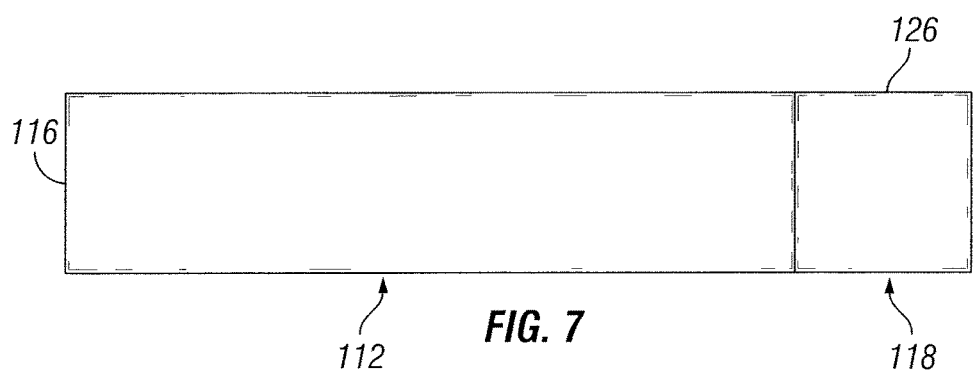
FIG. 7 illustrates an arm comprising a venturi in accordance with embodiments of the present disclosure.

FIG. 7 illustrates an arm 112 with a venturi 126 fluidly coupled to distal end 118. Venturi 126 may be coupled to arm 112 by any suitable means such as welds. Venturi 126 may be configured to create microbubbles in a body of water (e.g., body of water 101 shown on FIG. 2) as an air mass exits the venturi 126. It is to be understood that venture 126 refers to a constricted section of pipe that causes a reduction in fluid pressure. During operation of evaporation system 100, blower 104 (e.g., as shown on FIG. 2) may capture (e.g., via suction) an air mass from the surrounding area and may blow/force the air mass through spacer 106 into diffuser 108. The air mass may then exit diffuser 108 via venturi 126 into the body of water 101, thereby aerating the body of water 101.

Figure 8:
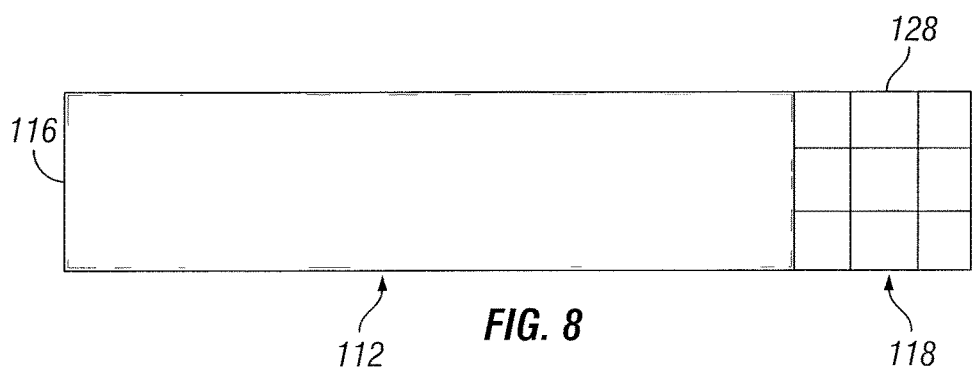
FIG. 8 illustrates an arm comprising a screen in accordance with embodiments of the present disclosure.

FIG. 8 illustrates an arm 112 with a screen 128 coupled to distal end 118 by any suitable means, such as, welds. Screen 128 may be made from any suitable metal, such as, for example, stainless steel. Screen 128 may be configured to create microbubbles in a body of water (e.g., body of water 101 shown on FIG. 2) as air passes/exits through screen 128. Mesh size of the screen 128 may be about 20 to about 100 mesh. During operation of evaporation system 100, blower 104 (e.g., as shown on FIG. 2) may capture (e.g., via suction) an air mass from the surrounding area and may blow/force the air mass through spacer 106 into diffuser 108. The air mass may then exit diffuser 108 via screen 128 into the body of water 101, thereby aerating the body of water 101.

Figure 9:
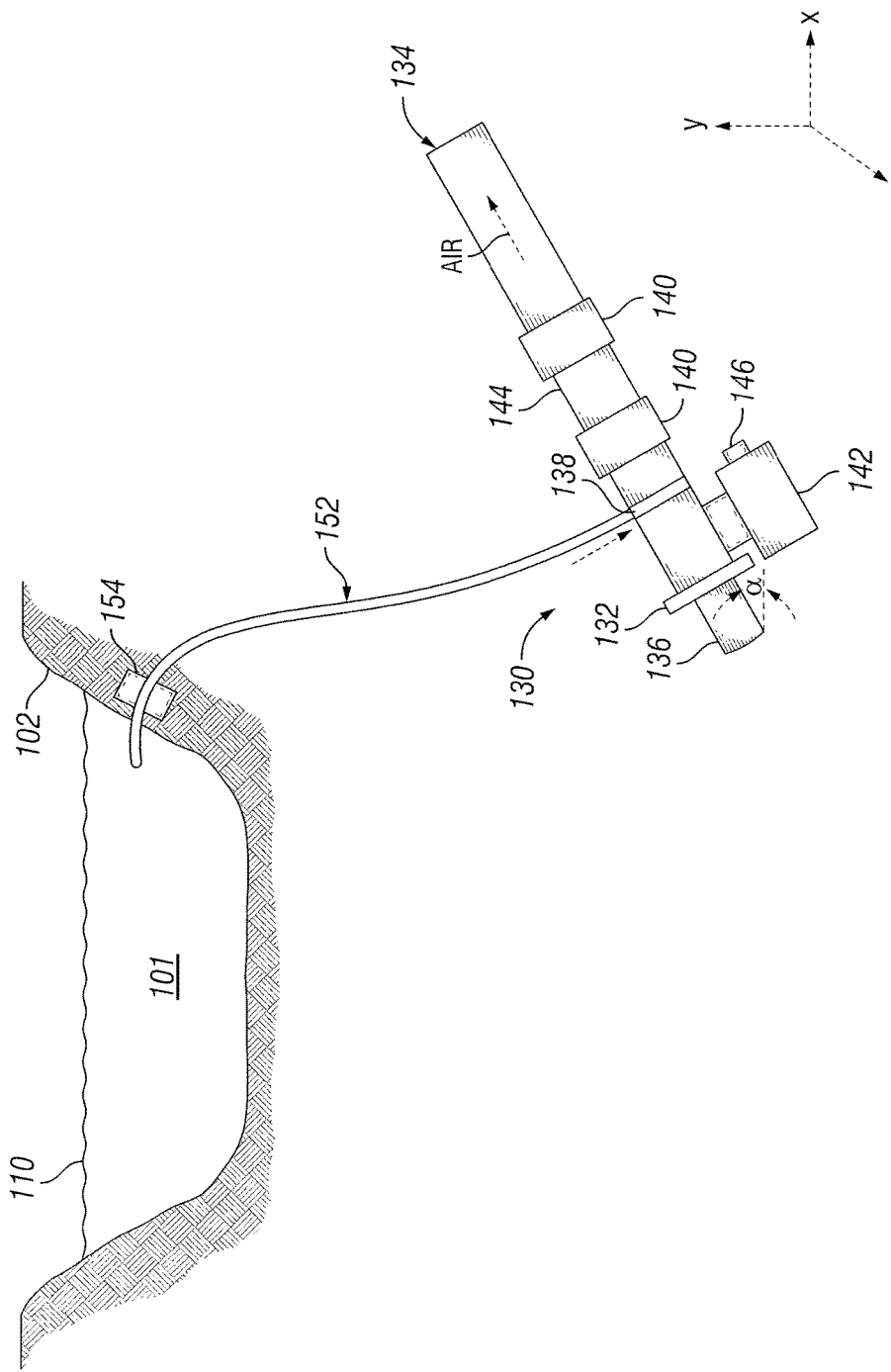
FIG. 9 illustrates a drying tunnel in accordance with embodiments of the present disclosure.

As shown in FIG. 9, in some embodiments, water from storage pit 102, which may include brine, may be pumped to a drying tunnel or evaporator and collection tunnel where additional air may be pumped into the evaporation tunnel while the water is sprayed into the air mass within the drying tunnel. Brine may comprise a brine solution comprising at least 10 wt % NaCl. In some embodiments, brine may comprise a brine solution comprising about 10 wt % NaCl to about 25 wt % NaCl. In other embodiments, brine may comprise a brine solution comprising more than 25 wt % NaCl. Other ranges may include ranges above what may be considered dischargeable to surface ground waters. As the water becomes concentrated and saturated with salts, the heavier water may be pulled off and then injected into subterranean disposal wells at significantly lower volumes then normal, thereby reducing the subsurface pressurization and aiding in prevention of seismic occurrences.

FIG. 9 illustrates tunnel 130 (e.g., a drying tunnel). Tunnel 130 may be a hollow conduit or recess. Tunnel 130 may be utilized in combination with evaporation unit(s) 100, or tunnel 130 may be utilized by itself. Tunnel 130 may include proximal end 132 and distal end 134. Distal end 134 may be open to the atmosphere. Tunnel 130 may include a shape of a drum or barrel. Tunnel 130 may comprise blower 136, nozzles 138, heaters 140 and a chamber 142 (e.g., a solids collection chamber). Tunnel 130 may be positioned at an inclination angle, $\alpha$, from about 1° to about 90° relative to horizontal (e.g., x axis, as shown). Alternatively, inclination angle, $\alpha$, may be about 30° to about 90°, or about 40° to about 50° (e.g., 45°). Tunnel 130 may be of a sufficient size and inner diameter and may be heated to prevent any carry over of the air mass. Tunnel 130 may include an inner diameter of about 8 feet to about 12 feet and a length of about 50 feet to about 200 feet. Tunnel 130 may be made of any suitable material, such as, for example, metal (e.g., steel, alloys).

Blower 136 may be fluidly coupled to proximal end 132 by any suitable means, such as, welds. Blower 136 may include a high volume blower and may move over 100,000 cubic feet of air per minute. In certain embodiments, blower 136 may move about 10,000 cubic feet of air per minute to about 500,000 cubic feet of air per minute. The inner diameter of blower 136 may be about 12 inches to about 96 inches. Blower 136 may be electrically powered and may include a motor rated from about 7 horsepower to about 150 horsepower. Blower 136 may also be powered by any other suitable means. Blower 136 may include ducted fans. Blower 136 may be placed at the lower end of tunnel 130 (e.g., proximal end 132) with a collection point (e.g., chamber 142) for the solids above the blower 136. Blower 136 may move over 100,000 cubic feet of air per minute. In certain embodiments, blower 136 may move about 10,000 cubic feet of air per minute to about 100,000 cubic feet of air per minute. Blower 136 may aid in evaporating the water within tunnel 130. Blower 136 may be electrically powered and may include a motor rated from about 7 horsepower to about 150 horsepower. Blower 136 may have an inner diameter from about 8 feet to about 12 feet.

Nozzles 138 may be disposed between the blower 136 and heaters 140. Nozzles 138 may be nozzles used in misting and evaporation systems. In some embodiments, nozzles 138 may include a plurality of nozzles (e.g., 10-40 nozzles, 30-35 nozzles, alternatively 32 nozzles) that may spray about 30 gallons per minute into the tunnel 130 with an air temperature of about 100° F. and an air rate of about 100,000 cfm. Based on the evaporation chart, the air mass at that temperature may be capable of holding about 300 lbs of water per min, or absorbing about 30 gallons per minute of water. The rate of water exiting the nozzles 138 may be adjusted to compensate for the influent air temperature to reach full evaporation. Nozzles 138 may be fluidly coupled to storage pit 102 (e.g., via line 152 and pump 154). Storage pit 102 may supply nozzles 138 with water. Nozzles 138 may be configured to spray water (e.g., water from storage pit 102) into tunnel 130.

Heaters 140 (e.g., electrically powered heaters) may include band heaters and/or direct contact heaters. Any other suitable heaters may be utilized. Heaters 140 may be incorporated on the outside surface 144 of tunnel 130 to heat the air mass and improve the vaporization exchange into the air mass. The heating temperatures may range from about 70° F. on cold days to over about 130° F. on hot summer days. Heaters 140 may aid in evaporating the water within tunnel 130.

Chamber 142 may be disposed between blower 136 and nozzles 138. Chamber 142 may be configured to receive/collect solids falling out of the water as the water evaporates within tunnel 130. Chamber 142 may include an auger 146 for removing solids from chamber 142. Chamber 142 may have a diameter from about 8 inches to about 10 inches or more. Auger 146 may be of about the same diameter of chamber 142.

Figure 10:
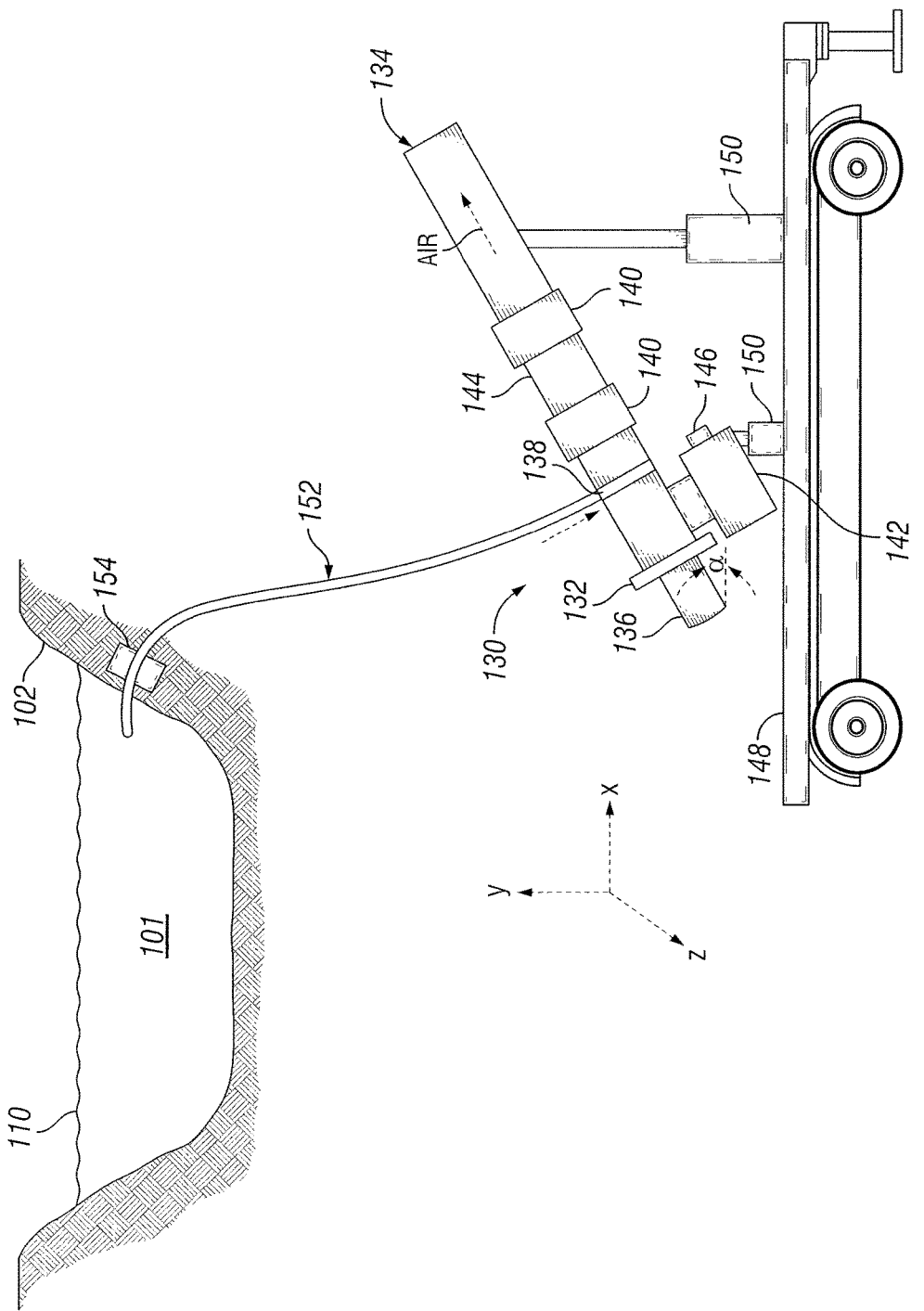
FIG. 10 illustrates a drying tunnel positioned on a vehicle trailer in accordance with embodiments of the present disclosure.
Figure 11:
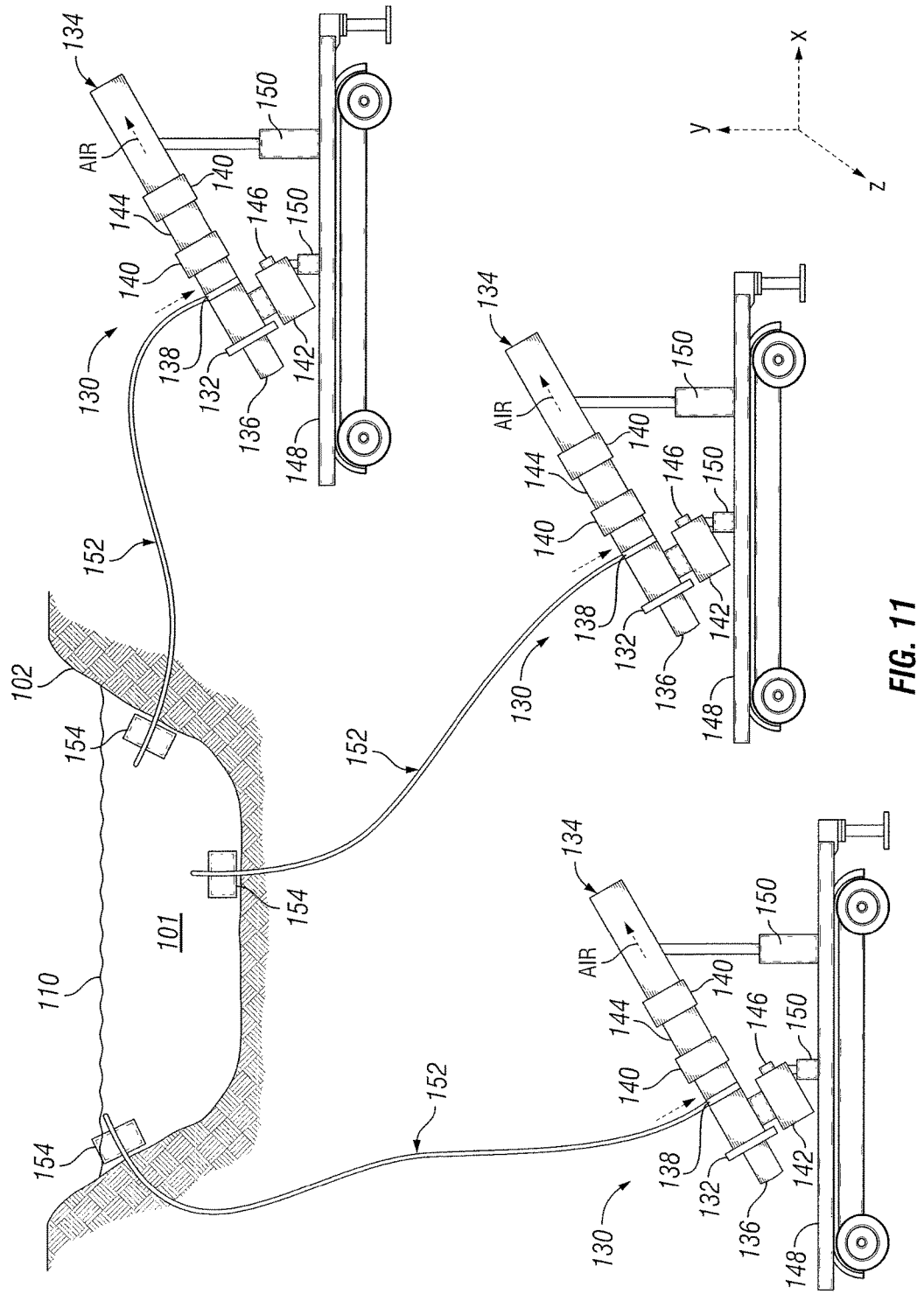
FIG. 11 illustrates a plurality of drying tunnels positioned on vehicle trailers in accordance with embodiments of the present disclosure.

In certain embodiments, tunnel 130 may be positioned on a trailer (e.g., vehicle trailer). FIG. 10 illustrates tunnel 130 positioned on trailer 148. Tunnel 130 may be coupled to trailer 148 via lifters 150 (e.g., hydraulic lifters—lifters actuated via fluid). Lifters 150 may lower and/or raise tunnel 130, thereby adjusting an inclination angle (e.g., α) relative to horizontal (e.g., x axis, as shown). Although FIG. 10 illustrates a single tunnel 130 and trailer 148, it should be noted that a plurality of tunnels 130 and trailers 148 may be utilized, as illustrated on FIG. 11.

During operation of tunnel 130, water from storage pit 102 may be pumped to nozzles 138. Nozzles 138 may spray water from storage pit 102 into the interior of tunnel 130. The nozzles 138 may spray at a rate below the absorption rate of the air mass. Blower 136 may capture air from the surrounding area and blow/force the air through tunnel 130 and out distal end 134 as heaters 140 heat the air and water mixture. As the water evaporates, the solids in the water (e.g., salt) may fall out of (e.g., separate from) the water and gravitationally move to the bottom of the angled tunnel 130 where they are collected in chamber 142. The solids in chamber 142 may be augured and transported for recycling or disposal. Tunnel 130 may be scraped to prevent buildup of salts inside of the inner surface of tunnel 130.

It should be noted that blower 104 may be referred to as a first blower and blower 136 may be referred to as a second blower.

Figure 12:
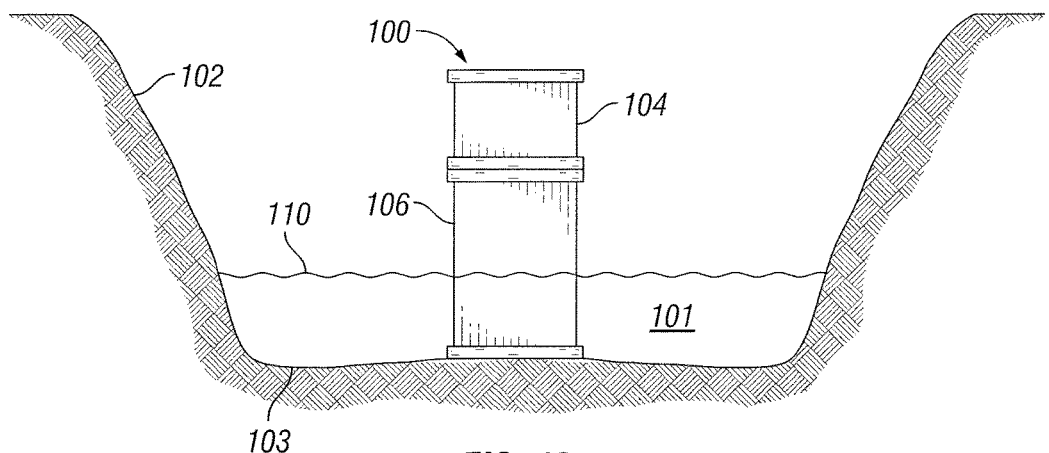
FIG. 12 illustrates an alternate embodiment of an evaporation unit without a diffuser positioned in a water storage pit in accordance with the present disclosure.

FIG. 12 illustrates another embodiment of evaporation unit 100. Evaporation unit 100 may be positioned within a body of water 101 of storage pit 102 (e.g., storage pit may contain produced water which may include brine). Evaporation unit 100 may include blower 104 and a spacer 106, as described above. The spacer 106 may be submerged (completely or partially) in the body of water 101. Blower 104 may be above the water surface 110. The body of water 101 may be received and stored in storage pit 102 from a subterranean formation.

Figure 13:
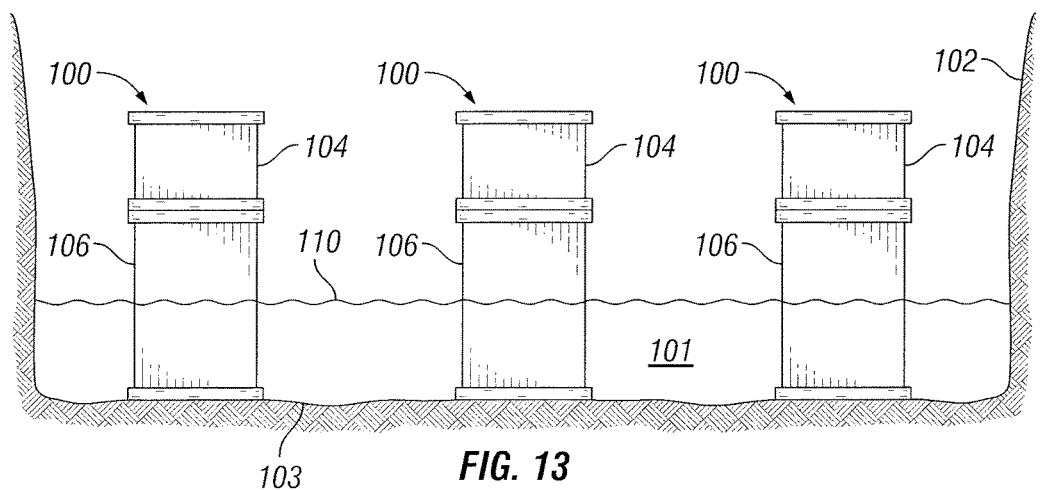
FIG. 13 illustrates an alternate embodiment of a plurality of evaporation units without diffusers positioned in a water storage pit in accordance with the present disclosure.

During operation of evaporation unit 100, blower 104 may capture (e.g., via suction) an air mass from the surrounding area and may blow/force the air mass through spacer 106 into the body of water 101, thereby aerating the body of water 101, as described above. The turbulence of the air mass as it passes through the body of water 101 may provide sufficient contact time as to allow the air mass to become fully or partially saturated. As the water evaporates, substances (e.g., salt) in the body of water 101 (e.g., salt) may accumulate at the bottom 103 of storage pit 102. It should be noted that although a single evaporation unit 100 is depicted in FIG. 12, a plurality of evaporation units 100 may be utilized, as shown in FIG. 13.

Figure 14:
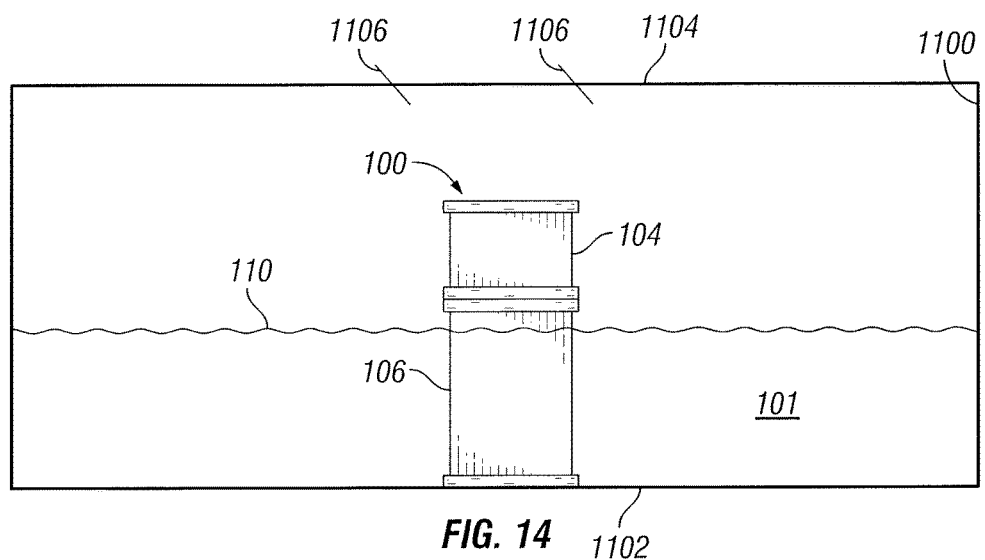
FIG. 14 illustrates another embodiment of an evaporation unit without a diffuser positioned completely in a storage tank in accordance with the present disclosure.

FIG. 14 illustrates another embodiment of evaporation unit 100. Evaporation unit 100 may include blower 104 and a spacer 106, as described above. Evaporation unit 100 may be positioned completely inside storage tank 1100 (e.g., above ground storage tank or below ground storage tank). Storage tank 1100 may include vents 1106. Spacer 106 may be positioned within a body of water 101 of storage tank 1100 (e.g., storage tank may contain produced water which may include brine). Blower 104 may be positioned above water surface 110. The body of water 101 may be received and stored in storage tank 1100 from a subterranean formation.

Figure 15:
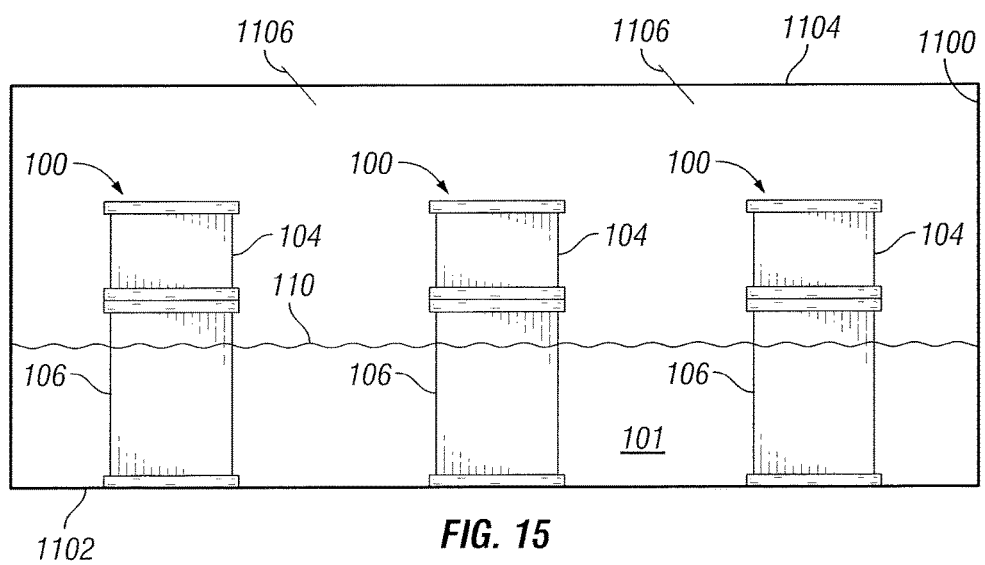
FIG. 15 illustrates an alternate embodiment of a plurality of evaporation units without diffusers positioned completely in a storage tank in accordance with the present disclosure.

During operation of evaporation unit 100, blower 104 may capture (e.g., via suction) an air mass from the surrounding area and may blow/force the air mass through spacer 106 into the body of water 101, thereby aerating the body of water 101, as described above. The turbulence of the air mass as it passes through the body of water 101 may provide sufficient contact time as to allow the air mass to become fully or partially saturated. As vapor escapes from the top (e.g., roof 1104) of tank 1100 (e.g., via vents 1106), any solids in the body of water 101 may accumulate at the storage tank floor 1102. It should be noted that although a single evaporation unit 100 is depicted in FIG. 14, a plurality of evaporation units 100 may be utilized, as shown in FIG. 15.

Figure 16:
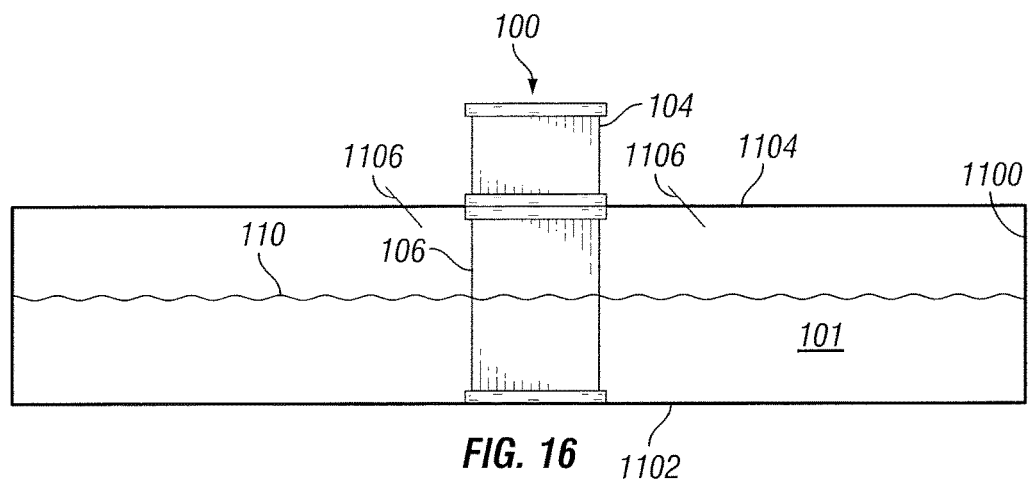
FIG. 16 illustrates another embodiment of an evaporation unit with a blower positioned on top of a storage tank in accordance with the present disclosure.

FIG. 16 illustrates another embodiment of evaporation unit 100. Evaporation unit 100 may include blower 104 and a spacer 106, as described above. A portion (e.g., spacer 106) of evaporation unit 100 may be positioned within storage tank 1100 (e.g., above ground storage tank or below ground storage tank that may contain produced water which may include brine). Storage tank 1100 may include vents 1106. Blower 104 may be placed on top (e.g., roof 1104) of storage tank 1100. Spacer 106 may extend from blower 104 into the body of water 101. Blower 104 may be secured to roof 1104 by any suitable means, such as, welds, bolts, screws, or combinations thereof. The body of water 101 may be received and stored in storage tank 1100 from a subterranean formation.

Figure 17:
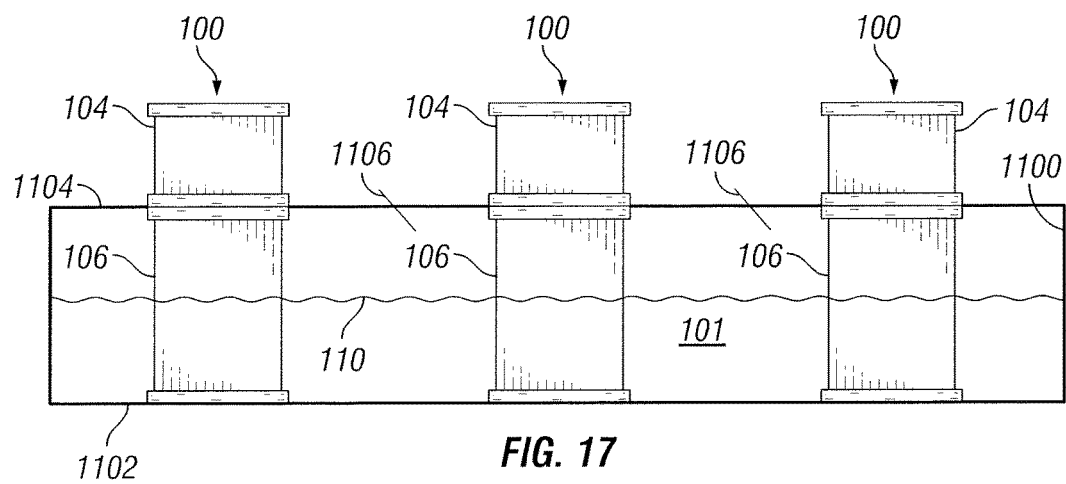
FIG. 17 illustrates an alternate embodiment of a plurality of evaporation units with blowers positioned on top of a storage tank in accordance with the present disclosure.

During operation of evaporation unit 100, blower 104 may capture (e.g., via suction) an air mass from the surrounding area and may blow/force the air mass through spacer 106 into the body of water 101, thereby aerating the body of water 101, as described above. The turbulence of the air mass as it passes through the body of water 101 may provide sufficient contact time as to allow the air mass to become fully or partially saturated. As vapor escapes from the top (e.g., roof 1104) of tank 1100 (e.g., via vents 1106), any solids in the body of water 101 may accumulate at the storage tank floor 1102. It should be noted that although a single evaporation unit 100 is depicted in FIG. 16, a plurality of evaporation units 100 may be utilized, as shown in FIG. 17.

Figure 18:
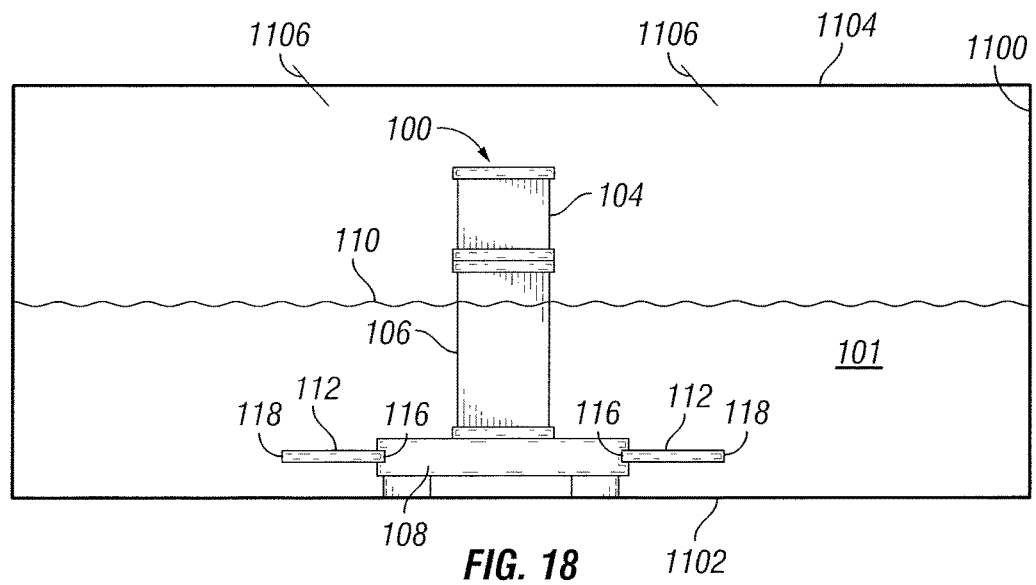
FIG. 18 illustrates another embodiment of an evaporation unit positioned completely inside a storage tank in accordance with the present disclosure.

FIG. 18 illustrates another embodiment of evaporation unit 100. Evaporation unit 100 may include blower 104, spacer 106, and diffuser 108. Evaporation unit 100 may be positioned completely inside storage tank 1100 (e.g., above ground storage tank or below ground storage tank that may contain produced water which may include brine). Storage tank 1100 may include vents 1106. Spacer 106 and diffuser 108 may be submerged (completely or partially) within the body of water 101 of storage tank 1100. Blower 104 may be positioned above water surface 110 and within storage tank 1100. The water 101 may be received and stored in storage tank 1100 from a subterranean formation.

Figure 19:
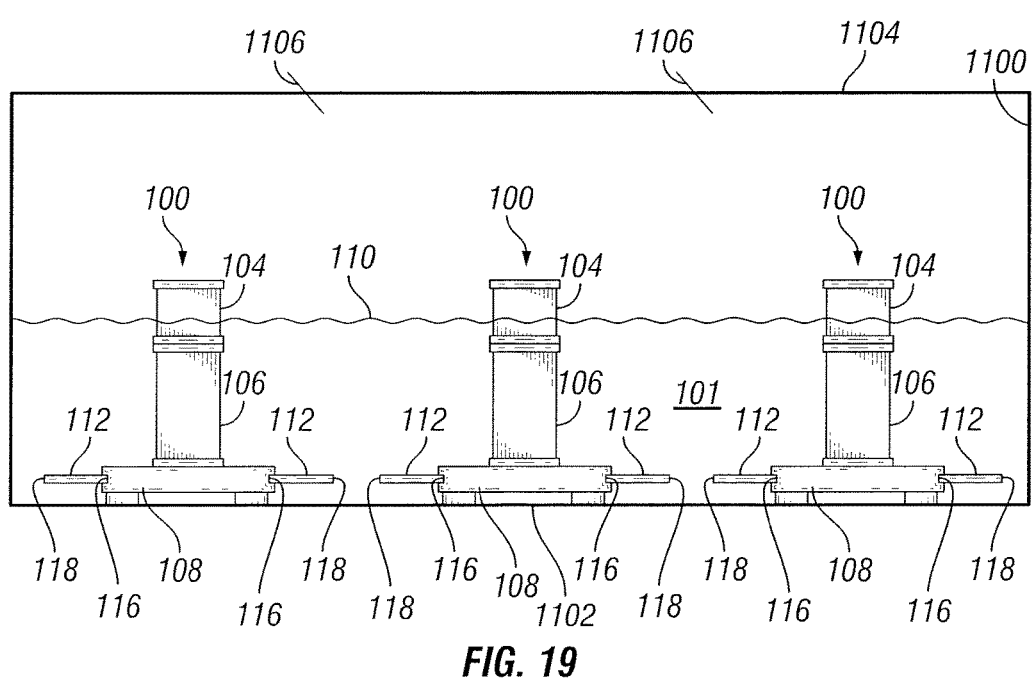
FIG. 19 illustrates an alternate embodiment of a plurality of evaporation units positioned completely inside a storage tank in accordance with the present disclosure.

During operation of evaporation unit 100, blower 104 may capture (e.g., via suction) an air mass from the surrounding area and may blow/force the air mass through spacer 106 and diffuser 108 into the body of water 101, thereby aerating the body of water 101, as described above. The turbulence of the air mass as it passes through the body of water 101 may provide sufficient contact time as to allow the air mass to become fully or partially saturated. As vapor escapes from the top (e.g., roof 1104) of tank 1100 (e.g., via vents 1106), any solids in the body of water 101 may accumulate at the storage tank floor 1102. It should be noted that although a single evaporation unit 100 is depicted in FIG. 18, a plurality of evaporation units 100 may be utilized, as shown in FIG. 19.

Figure 20:
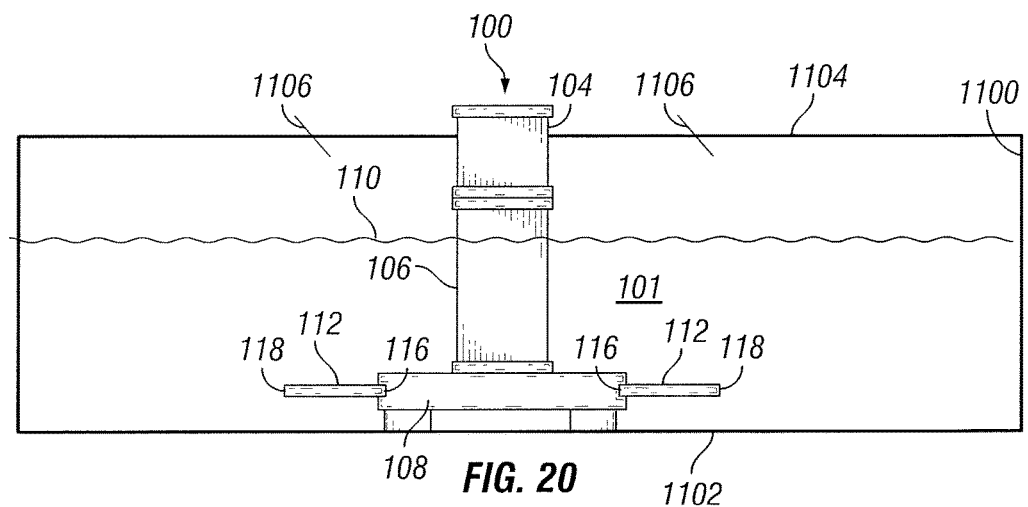
FIG. 20 illustrates another embodiment of an evaporation unit with a blower positioned on top of a storage tank in accordance with the present disclosure.

FIG. 20 illustrates another embodiment of evaporation unit 100. Evaporation unit 100 may include blower 104, spacer 106, and diffuser 108, as described above. A portion (e.g., spacer 106 and diffuser 108) of evaporation unit 100 may be positioned in storage tank 1100 (e.g., above ground storage tank or below ground storage tank that may contain produced water which may include brine). Blower 104 may be placed on top (e.g., roof 1104) of storage tank 1100. Spacer 106 and diffuser 108 may be submerged (completely or partially) within the body of water 101 of storage tank 1100. Blower 104 may be secured to roof 1104 by any suitable means, such as, welds, bolts, screws, or combinations thereof. The body of water 101 may be received and stored in storage tank 1100 from a subterranean formation.

Figure 21:
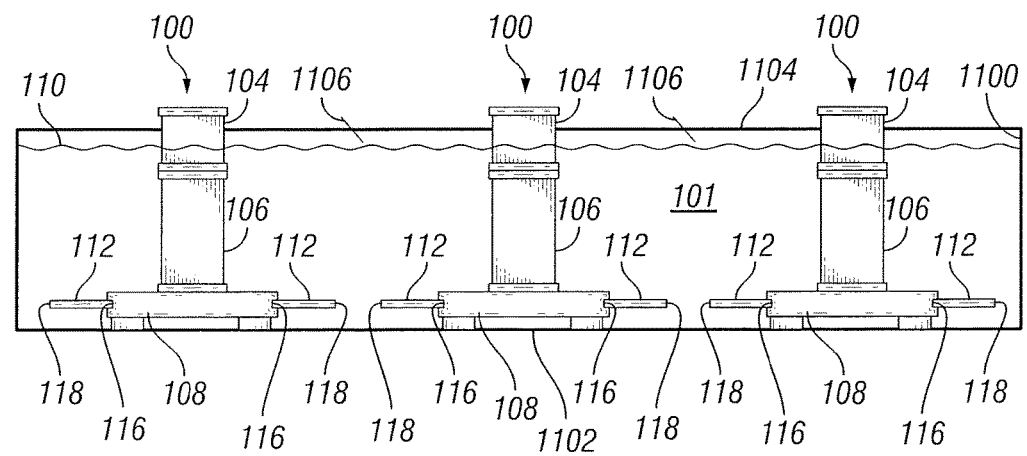
FIG. 21 illustrates an alternate embodiment of a plurality of evaporation units with blowers positioned on top of a storage tank in accordance with the present disclosure.

During operation of evaporation unit 100, blower 104 may capture (e.g., via suction) an air mass from the surrounding area and may blow/force the air mass through spacer 106 into the body of water 101, thereby aerating the body of water 101, as described above. The turbulence of the air mass as it passes through the body of water 101 may provide sufficient contact time as to allow the air mass to become fully or partially saturated. As vapor escapes from the top (e.g., roof 1104) of tank 1100 (e.g., via vents 1106), any solids in the body of water 101 may accumulate at the storage tank floor 1102. It should be noted that although a single evaporation unit 100 is depicted in FIG. 20, a plurality of evaporation units 100 may be utilized, as shown in FIG. 21.

It is believed that the operation and construction of the present disclosure will be apparent from the foregoing description. While the apparatus and methods shown or described above have been characterized as being preferred, various changes and modifications may be made therein without departing from the spirit and scope of the disclosure as defined in the following claims.

What is claimed is:

1. A system for aerating, evaporating, and treating a contaminated body of water comprising:
    at least one evaporation unit, wherein the at least one evaporation unit comprises:
        a first blower configured to suction an air mass proximate the contaminated body of water;
        a spacer fluidly coupled to the first blower;
        a diffuser fluidly coupled to the spacer; and,
        at least one arm coupled to and extending away from the diffuser, wherein the at least one arm is hollow and is configured to allow the air mass to pass through the at least one arm;
    at least one drying tunnel, wherein the at least one drying tunnel comprises:
        a second blower, wherein the second blower is fluidly coupled to an end of the at least one drying tunnel;
        a heater coupled to the at least one drying tunnel;
        at least one nozzle configured to be a coupled to the contaminated body of water, the at least one nozzle disposed between the heater and the second blower; and
        a chamber configured to collect solids.

2. The system of claim 1, wherein the at least one evaporation unit is configured to be positioned in one of a) a storage tank configured to contain the contaminated body of water and b) a storage pit configured to contain the contaminated body of water.

3. The system of claim 1, wherein at least one of the spacer and the first blower is configured to be partially submerged in the contaminated body of water.

4. The system of claim 2, wherein the first blower is configured to be positioned on top of the storage tank.

5. The system of claim 1, wherein the at least one drying tunnel is positioned at an angle from about 30° to about 90° relative to horizontal.

6. A system for aerating, evaporating, and treating a contaminated body of water comprising:
    at least one of a storage tank and a storage pit configured to contain the contaminated body of water;
    at least one evaporation unit configured to be positioned in one of the at least one of the storage tank and the storage pit, wherein each evaporation unit comprises:
        a first blower configured to suction an air mass proximate the contaminated body of water;
        a spacer fluidly coupled to the first blower;
        a diffuser fluidly coupled to the spacer; and,
        at least one arm coupled to and extending away from the diffuser, wherein the at least one arm is hollow and is configured to allow the air mass to pass through the at least one arm; and
    at least one drying tunnel, wherein the at least one drying tunnel comprises:
        a second blower, wherein the second blower is fluidly coupled to an end of the at least one drying tunnel;
        a heater coupled to the at least one drying tunnel;
        at least one nozzle configured to be a coupled to the contaminated body of water, the at least one nozzle disposed between the heater and the second blower; and
        a chamber configured to collect solids.

7. The system of claim 6, wherein at least one of the first blower and the second blower is configured to move over 100,000 cubic feet of air per minute.

8. The system of claim 6, wherein at least one of the spacer and the first blower is configured to be partially submerged in the contaminated body of water.

9. The system of claim 8, wherein at least one of the plurality of drying tunnels is positioned at an angle from about 30° to about 90° relative to horizontal.

10. The system of claim 6, wherein the at least one evaporation unit comprises a plurality of evaporation units.

11. The system of claim 6, wherein the at least one drying tunnel comprises a plurality of drying tunnels.

12. A system for aerating, evaporating, and treating a contaminated body of water comprising:
    at least one evaporation unit configured to be positioned at least partially within the contaminated body of water, wherein the evaporation unit comprises:
        a first blower configured to suction an air mass proximate the contaminated body of water; and
        a spacer fluidly coupled to the first blower; and
    at least one drying tunnel, wherein the drying tunnel comprises:
        a hollow conduit with a proximal end and a distal end spaced apart from the proximal end;
        a second blower fluidly coupled to the proximal end of the at least one drying tunnel and configured to provide a stream of air into the at least one drying tunnel;
        a heater coupled the at least one drying tunnel;
        at least one nozzle configured to be a coupled to the contaminated body of water, the at least one nozzle disposed between the heater and the second blower and configured to provide the contaminated water into the at least one drying tunnel and the stream of air passing therethrough; and, a chamber coupled to and disposed exterior to the at least one drying tunnel, the chamber configured to collect solids falling out of solution from the contaminated water as the contaminated water is evaporated.

13. The system of claim 12, wherein the at least one evaporation unit further comprises:

a diffuser fluidly coupled to the spacer; and, at least one arm coupled to and extending away from the diffuser, wherein the at least one arm is hollow and is configured to allow the air mass to pass through the at least one arm.

14. The system of claim 12, wherein at least one of the first blower and the second blower is configured to move over 100,000 cubic feet of air per minute.

15. The system of claim 12, wherein at least one of the second blower and the at least one drying tunnel has an inner diameter from about 8 feet to about 12 feet.

16. The system of claim 12, wherein a length of the at least one drying tunnel is about 50 feet to about 200 feet.

17. The system of claim 12, wherein the at least one drying tunnel is disposed on a trailer.

18. The system of claim 12, wherein the chamber is positioned between the second blower and the at least one nozzle.

19. The system of claim 12, wherein the at least one drying tunnel is positioned at an angle from about 30° to about 90° relative to horizontal.

* * * * *